United States Patent
Cha et al.

(10) Patent No.: US 10,619,555 B2
(45) Date of Patent: Apr. 14, 2020

(54) PRESSURE CAP FOR COOLING SYSTEM OF VEHICLE

(71) Applicants: Hyundai Motor Company, Seoul (KR); Kia Motors Corporation, Seoul (KR)

(72) Inventors: Yong-Woong Cha, Yongin-si (KR); Joong-Su Yun, Gunpo-si (KR); Wan-Je Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 159 days.

(21) Appl. No.: 15/824,296

(22) Filed: Nov. 28, 2017

(65) Prior Publication Data

US 2018/0163610 A1    Jun. 14, 2018

(30) Foreign Application Priority Data

Dec. 13, 2016  (KR) .................. 10-2016-0169648

(51) Int. Cl.
*B65D 51/16*  (2006.01)
*F01P 11/02*  (2006.01)
*F16K 24/00*  (2006.01)
*F16K 17/196*  (2006.01)
*B65D 51/24*  (2006.01)

(52) U.S. Cl.
CPC ........ *F01P 11/0238* (2013.01); *F16K 17/196* (2013.01); *F16K 24/00* (2013.01); *F01P 11/0214* (2013.01); *F01P 2011/0228* (2013.01); *F01P 2011/0233* (2013.01)

(58) Field of Classification Search
CPC ............... F01P 11/0238; F01P 11/0214; F01P 2011/0228; F01P 2011/0233; F16K 17/196; F16K 24/00
USPC ......................... 220/203.23, 203.28, 203.24
See application file for complete search history.

(56) References Cited

U.S. PATENT DOCUMENTS 4,498,599 A * 2/1985 Avrea ................... F01P 11/0238
                                                        220/203.26
5,169,015 A * 12/1992 Burke .................. F01P 11/0247
                                                        220/203.07
(Continued)

FOREIGN PATENT DOCUMENTS

JP          H 04-334721 A       11/1992

*Primary Examiner* — J. Gregory Pickett
*Assistant Examiner* — Niki M Eloshway
(74) *Attorney, Agent, or Firm* — Morgan, Lewis & Bockius LLP

(57) ABSTRACT

A pressure cap for a cooling system of a vehicle may include a reservoir fill port which is mounted at an upper portion of a reservoir in which cooling water is stored in a cooling system of the vehicle; an external cap for closing an upper end portion of the reservoir fill port; a pressure valve disposed in the reservoir fill port to allow the inside and the outside of the reservoir fill port to fluidically-communicate with each other; a valve seal provided to allow the air to flow from the outside into the internal to the cooling system by being deformed when pressure in the internal to the cooling system is lower than a predetermined pressure; and a positive pressure spring elastically supporting the pressure valve such that the pressure valve closes the internal to the reservoir fill port.

9 Claims, 8 Drawing Sheets

(56) References Cited

U.S. PATENT DOCUMENTS

| | | | | |
|---|---|---|---|---|
| 5,248,052 | A * | 9/1993 | Mellinger | F01P 3/2207 |
| | | | | 123/41.54 |
| 2004/0056034 | A1* | 3/2004 | Reutter | F01P 11/0238 |
| | | | | 220/303 |
| 2005/0082289 | A1* | 4/2005 | Reutter | F01P 11/0238 |
| | | | | 220/203.27 |
| 2006/0151498 | A1* | 7/2006 | Reutter | F01P 11/0238 |
| | | | | 220/202 |
| 2016/0146094 | A1* | 5/2016 | Cha | F01P 7/14 |
| | | | | 123/41.08 |
| 2017/0183131 | A1* | 6/2017 | Kishore Kumar | F01P 11/0238 |
| 2018/0073823 | A1* | 3/2018 | Byun | F01P 11/02 |

* cited by examiner

PRESSURE CAP FOR COOLING SYSTEM OF VEHICLE

CROSS-REFERENCE TO RELATED APPLICATIONS

The present application claims priority to Korean Patent Application No. 10-2016-0169648, filed on Dec. 13, 2016, the entire contents of which is incorporated herein for all purposes by this reference.

BACKGROUND OF THE INVENTION

Field of the Invention

The present invention relates to a pressure cap for a cooling system of a vehicle, which is mounted at an upper portion of a reservoir in which cooling water is stored or a radiator through which cooling water flows into a cooling system of a vehicle, and more particularly, to a pressure cap for a cooling system of a vehicle that has a simple structure and can adjust internal pressure without degrading performance.

Description of Related Art

Vehicles are provided with a radiator for cooling heat generated by operation of an engine by radiating the heat generated from the engine to the outside and a cooling system for circulating cooling water from the engine to the radiator.

Furthermore, the cooling system is mounted with a pressure cap for maintaining pressure in the cooling system at an appropriate level.

The pressure cap 110 is formed to have a structure as shown in FIG. 1 and mounted at the radiator or a cooling water reservoir in which the cooling water is stored. When pressure in the radiator or the reservoir is increased, the pressure cap 110 relieves internal pressure, whereas when the pressure in the cooling system becomes lower than the predetermined pressure, the pressure cap allows the external air to be introduced such that the pressure in the cooling system is maintained at the appropriate level.

Briefly describing an exemplary structure in which the pressure cap 110 is mounted at the cooling water reservoir, the pressure cap includes: a reservoir fill port 111 coupled to an upper end portion of the reservoir, an external cap 112 covering an upper portion of the reservoir fill port 111, a positive pressure valve 113 and a negative pressure valve 114 which are mounted inside the reservoir fill port 111 to control flow of the cooling water or air, a positive pressure spring 115 for elastically supporting the positive pressure valve 113, and a negative pressure spring 116 for elastically supporting the negative pressure valve 114.

If the pressure in the cooling system, for example, the cooling water reservoir exceeds the predetermined pressure range, the positive pressure valve 113 is raised and thus the pressurized cooling water or air is discharged through a communication port 111a.

On the other hand, if the internal pressure is lower than the predetermined pressure range, the negative pressure valve 114 is lowered and thus the external air is introduced through the communication port 111a so that the pressure in the cooling system is maintained within the predetermined pressure range.

However, in the pressure cap 110 for a cooling system of a vehicle having the structure as described above, there is a problem in that since pressure is regulated by use of both the positive pressure valve 113 and the negative pressure valve 114, structure of the pressure cap is complicated and thus manufacturing cost is increased.

Furthermore, since the positive pressure valve 113 and the negative pressure valve 114 operate depending on elastic forces of the positive pressure spring 115 and the negative pressure spring 116, it is not easy to adjust elastic forces of the positive pressure spring 115 and the negative pressure spring 116, which act oppositely, and there is a limit to minimizing the elastic force of the negative pressure spring 116.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pressure cap for a cooling system of a vehicle that has a simple structure and can maintain internal pressure within a predetermined range.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with one aspect of the present invention for accomplishing the object as mentioned above, a pressure cap for a cooling system of a vehicle may include: a reservoir fill port which is mounted at an upper portion of a reservoir in which cooling water is stored or a radiator through which cooling water flows into a cooling system of a vehicle and is provided at its lateral side with a communication port through which the cooling water or air flows; an external cap for closing an upper end portion of the reservoir fill port; a pressure valve disposed in the reservoir fill port to be configured for moving upwards and downwards and allow the inside and the outside of the reservoir fill portion to fluidically-communicate with each other; a valve seal provided to be in close contact with the pressure valve and allow the air to flow externally into the internal to the cooling system by being deformed when pressure in the internal to the cooling system is lower than a predetermined pressure; and a positive pressure spring elastically supporting the pressure valve such that the pressure valve closes the internal to the reservoir fill port.

The reservoir fill port further may include in the inside thereof a lower body supporting a bottom surface of the pressure valve and an upper body supporting an upper end portion of the positive pressure spring wherein the valve seal may include a flexible material and is mounted between the pressure valve and the lower body.

The lower body is provided at its center with a through hole perforating the lower body in an axial direction wherein the through hole is formed to have a diameter larger than a through hole formed in the center of the pressure valve.

The valve seal may include a valve seal body formed in a disk shape and disposed between the pressure valve and the lower body wherein the valve seal body may include at least one communication hole for allowing upper and lower faces of the valve seal body to fluidically-communicate with each other.

The valve seal body further may include a valve seal head formed to extend upwardly from the valve seal body such that it penetrates the pressure valve and support protrusions extending downwardly from a periphery of the valve seal head and having a lower end portion supported at one side of the pressure valve wherein the support protrusions are distanced from each other with an interval therebetween.

The communication hole is formed in plural numbers with a predetermined angular interval therebetween along the periphery of the valve seal.

The valve seal is configured such that it is raised together with the pressure valve and allows the reservoir fill port and the communication port to fluidically-communicate with each other when the pressure in the cooling system is higher than the predetermined pressure.

The valve seal is configured to be deformed such that the valve seal body is distanced from the bottom surface of the pressure valve and allow fluidical communication from the communication port to the internal to the reservoir fill port when the pressure in the cooling system is lower than the predetermined pressure.

The valve seal head is formed in a conical shape and formed to have an upper diameter greater than a diameter of the through hole formed at the center of the pressure valve.

The valve seal may include rubber or silicon material.

An insert for reinforcing strength of the valve seal body is inserted into the valve seal body of the valve seal.

The insert may include synthetic resin or metal material.

In the pressure cap for a cooling system of a vehicle constituted as described above in accordance with various aspects of the present invention, since structure of the internal to the pressure cap is simplified by eliminating a negative pressure spring, possibility of failure of components is reduced and hence reliability of operation of the pressure cap is secured and quality control is facilitated.

Furthermore, since the structure is simple, manufacturing cost can be reduced.

Moreover, since the number of springs used for pressure control is reduced, elastic force of the spring can be easily adjusted.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
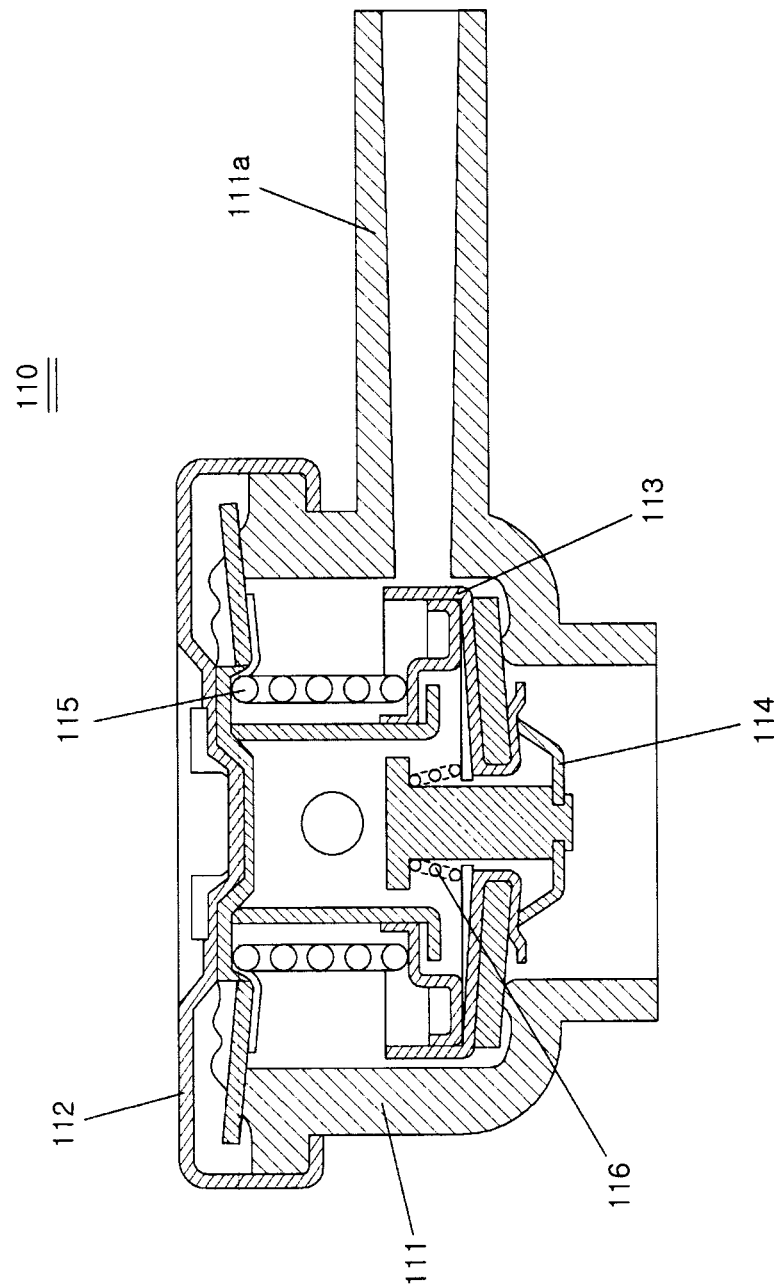
FIG. 1 is a cross-sectional view of a pressure cap for a cooling system of a vehicle in accordance with a related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a pressure cap for a cooling system of a vehicle according to an exemplary embodiment of the present invention is described more specifically with reference to the accompanying drawings.

A pressure cap 10 for a cooling system of a vehicle according to an exemplary embodiment of the present invention includes: a reservoir fill port 11 which is mounted at an upper portion of a reservoir in which cooling water is stored or a radiator through which cooling water flows into a cooling system of a vehicle and is provided at its lateral side with a communication port 11a through which the cooling water or air flows; an external cap 14 for closing an upper end portion of the reservoir fill port 11; a pressure valve 15 disposed in the reservoir fill port 11 to be configured for moving upwards and downwards and allow the inside and the outside of the reservoir fill portion 11 to fluidically-communicate with each other; a valve seal 16 provided to be in close contact with the pressure valve 15 and allow the air to flow externally into the internal to the cooling system by being deformed when pressure in the internal to the cooling system is lower than a predetermined pressure; and a positive pressure spring 17 elastically supporting the pressure valve 15 such that the pressure valve 15 closes the internal to the reservoir fill port 11.

The reservoir fill port 11 is disposed at the upper portion of the reservoir in which the cooling water is stored or the radiator where the cooling water is cooled in the cooling system. The cooling water can be replenished into the cooling system through the reservoir fill port 11 wherein the reservoir fill port becomes a passage for discharging the pressurized cooling water or air to the outside when the pressure in the cooling system is greater than the predetermined pressure, while it allows the air to be introduced into the inside externally so that the cooling system is maintained in an appropriate pressure when the pressure in the cooling system is lower than the predetermined pressure.

The reservoir fill port 11 has a structure of which inside is hollow and upper and lower sides are open. The reservoir fill port 11 is also formed in its lateral direction with the communication port 11a communicating with the center portion thereof. The cooling water or air in overpressure is discharged to the outside through the communication port 11a, while the external air flows into the internal to the cooling system through the communication port 11a when pressure is very low.

The pressure cap 10 is screw-fastened onto an upper end portion of the reservoir fill port 11.

When the pressure cap 10 is screw-fastened onto the upper end portion of the reservoir fill port 11, it closes an open top end portion of the reservoir fill port 11. When the pressure cap 10 is disengaged from the reservoir fill port 11, cooling water can be poured through the top end portion of the reservoir fill port 11.

An upper body 13 and a lower body 12 are disposed in a vertical direction within the reservoir fill port 11.

The upper body 13 and the lower body 12 are screw-fastened with each other to form space in the internal to them. The lower body 12 is formed such that a center portion thereof is penetrated to allow cooling water or air to flow therethrough and that a portion of the lateral side of the lower body 12 fluidically-communicates with the communication port 11a such that the cooling water or air in overpressure is discharged or air can be introduced from the outside therethrough.

The pressure valve 15 is accommodated onto an internal bottom surface of the lower body 12. The pressure valve 15 maintains a state of being accommodated onto the internal bottom surface of the lower body 12 when the pressure in the cooling system is within an appropriate range, whereas when the pressure in the cooling system is increased, the pressure valve is distanced from the internal bottom surface of the lower body 12 by the increased pressure to relieve the pressure in the cooling system.

The pressure valve 15 is elastically supported in a direction in which the pressure valve 15 is lowered, i.e., a direction in which the pressure valve 15 is accommodated onto the lower body 12 by the positive pressure spring 17 elastically supported by the upper body 13. The pressure valve 15 is not opened by the positive pressure spring 17 until the pressure in the cooling system becomes greater than the elastic force of the positive pressure spring 17.

The valve seal 16 is disposed between a bottom surface of the pressure valve 15 and an internal bottom surface of the lower body 12 such that the pressure valve 15 and the lower body 12 are sealed with each other when the pressure in the cooling system is an appropriate pressure whereas the valve seal is deformed to release the airtightness when the pressure in the cooling system becomes lower than the predetermined pressure so that the air can be introduced into the cooling system from the outside to maintain the predetermined pressure.

The valve seal 16 includes a flexible material such that it can be easily deformed when the pressure in the cooling system is low. The valve seal 16 includes rubber or silicon material. Since the valve seal 16 includes a flexible material, it seals between the pressure valve 15 and the lower body 12 when the internal to the cooling system is at an appropriate pressure, i.e., within the predetermined range. Furthermore, when the pressure in the cooling system is lowered, the valve seal can be easily deformed so that air can be introduced from the outside.

The valve seal 16 includes a disc-shaped valve seal body 16a, a communication hole 16b formed to penetrate the upper and lower faces of the valve seal 16, a valve seal head 16c formed to extend upwardly from the valve seal body 16a, and support protrusions 16d extending downwardly from the periphery of the valve seal head 16c.

The valve seal body 16a is formed in a disk shape and is disposed between the bottom surface of the pressure valve 15 and the lower body 12. The valve seal body 16a seals essentially the pressure valve 15 and the lower body 12.

The communication hole 16b is formed such that the upper and lower faces of the valve seal body 16a fluidically-communicate with each other. At least one communication hole 16b is formed. A plurality of the communication holes 16b are formed at a predetermined interval therebetween along the periphery of the valve seal 16.

The valve seal head 16c is formed to extend upwardly from the upper surface of the valve seal body 16a and to penetrate the pressure valve 15. A through hole is formed at the center of the pressure valve 15 and the upper valve seal head 16c is formed to penetrate the through hole. The upper portion of the valve seal head 16c is formed to have diameter greater than that of the middle portion such that the valve seal 16 is not separated from the pressure valve 15. The valve seal head 16c is formed in a conical shape such that it is easily inserted into the through hole formed in the pressure valve 15. A portion of the valve seal head 16c, which penetrates the pressure valve 15, is formed such that a gap is formed between the portion and an internal surface of the through hole of the pressure valve 15 so that the gap is configured as a passage for allowing the air to be introduced from the outside when the pressure in the cooling system is low.

The support protrusions 16d are formed to extend downwardly from the periphery of the valve seal head 16c. Lower end portions of the support protrusions 16d are supported on the upper surface of the pressure valve 15, improving airtight performance. The support protrusions 16d are formed in plural such that they are distanced from each other. The support protrusions 16d form a space between one support protrusion and another adjacent support protrusion 16d, which is configured as a passage through which air is introduced from the outside when the pressure in the cooling system is low.

Reference numerals 18 and 19 which are not described herein denote O-rings for airtightness.

Operation of the pressure cap for a cooling system of a vehicle having the configuration as described above in accordance with various exemplary embodiments of the present invention will be described below.

Figure 2:
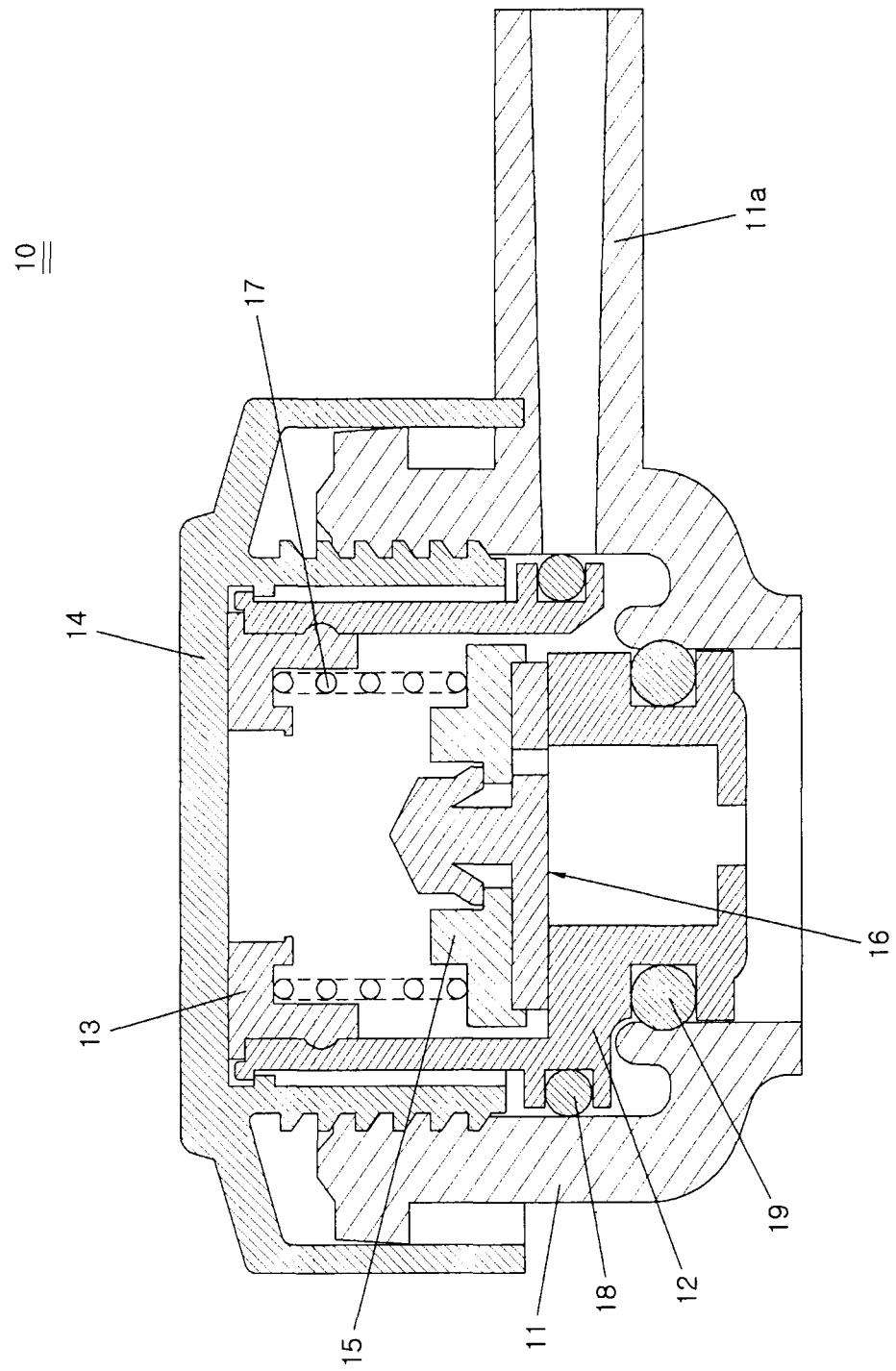
FIG. 2 is a cross-sectional view of a pressure cap for a cooling system of a vehicle in accordance with various exemplary embodiments of the present invention.
Figure 3A:
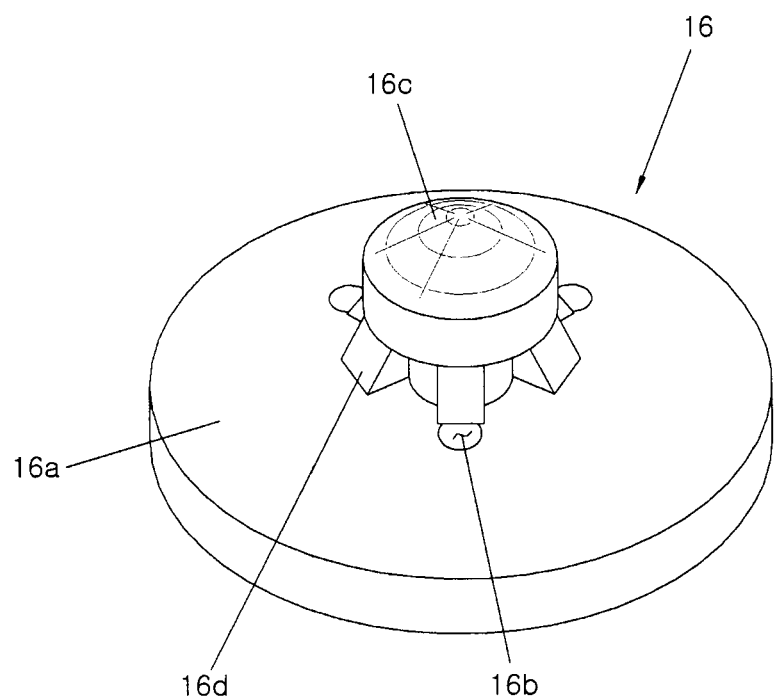
FIG. 3A is a perspective view of a valve seal in a pressure cap for a cooling system of a vehicle in accordance with various exemplary embodiments of the present invention.
Figure 3B:
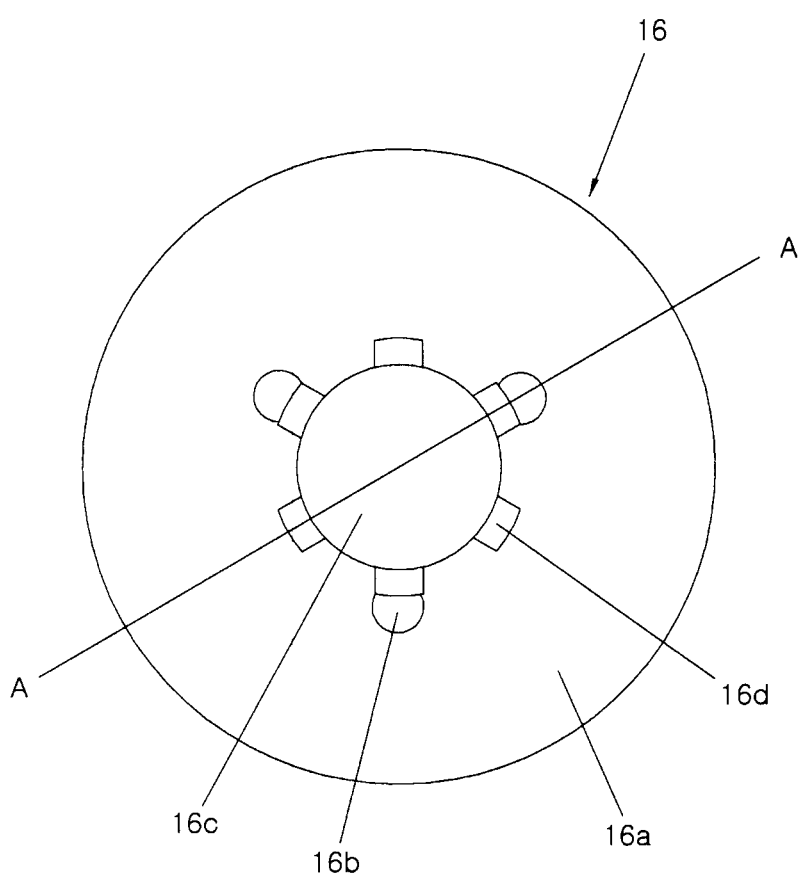
FIG. 3B is a top plan view of a valve seal in a pressure cap for a cooling system of a vehicle in accordance with various exemplary embodiments of the present invention.
Figure 3C:
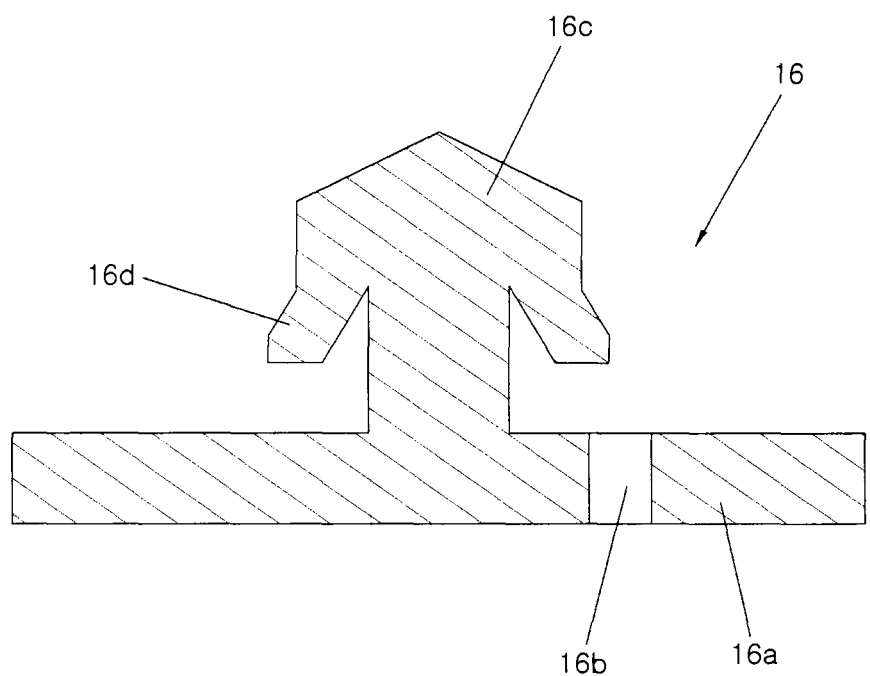
FIG. 3C is a cross-sectional view taken along line A-A of FIG. 3B.

FIG. 2 shows a state in which pressure in the cooling system is in a predetermined range. In the present state, the pressure valve 15 is hermetically sealed to the lower body 12 so that the inside and the outside of the reservoir fill port 11 are sealed to prevent outflow of the cooling water and inflow of the air from the outside, =maintaining an appropriate pressure.

Figure 4A:
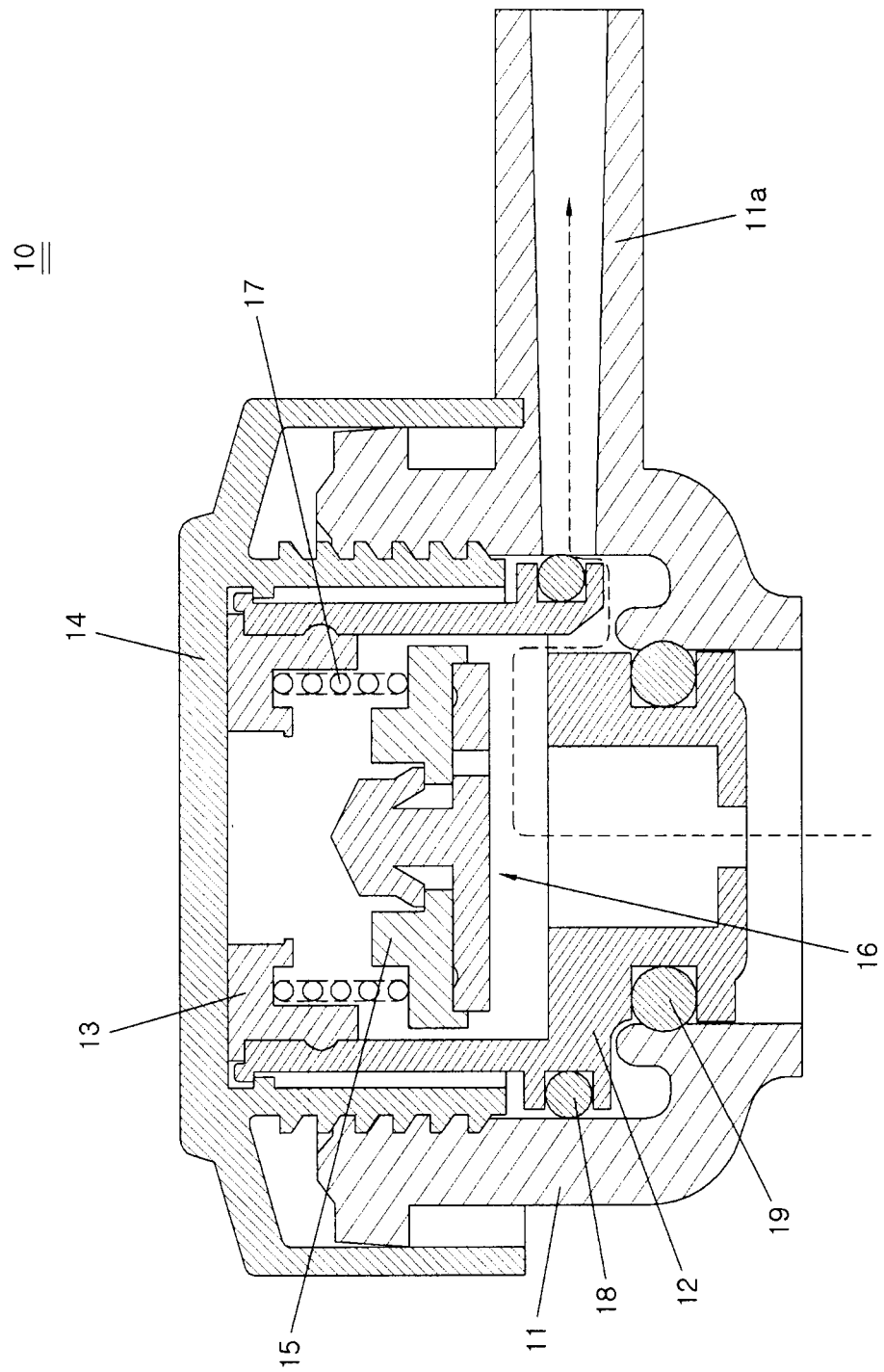
FIG. 4A is a cross-sectional view showing a state in which internal pressure is released in a pressure cap for a cooling system of a vehicle in accordance with various exemplary embodiments of the present invention.

FIG. 4A shows a state in which pressure in the cooling system is higher than the predetermined range. In the present state, since the pressure in the cooling system is high, force caused by the pressure is greater than elastic force of the positive pressure spring 17 and as a result the pressure valve 15 is raised.

When the pressure valve 15 is raised, the pressure valve 15, the lower portion of the reservoir fill port 11, the lower end portion of the lower body 12, the lateral side of the lower body 12 and the communication port 11a fluidically-communicate with one another, with the result that the cooling water or air whose pressure has increased in the cooling system is discharged to the outside to relieve the pressure and in turn an appropriate pressure is maintained.

Figure 4B:
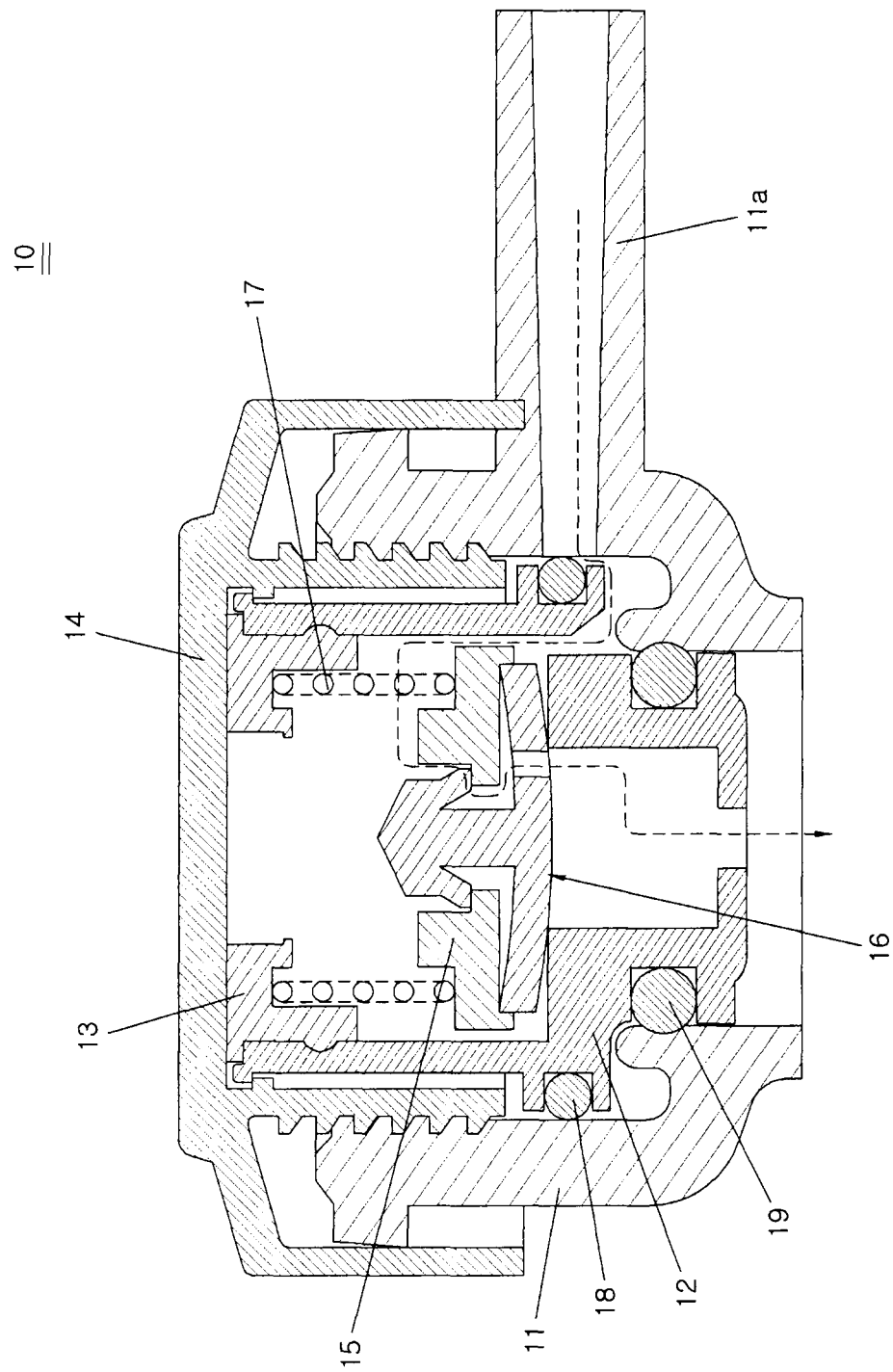
FIG. 4B is a cross-sectional view showing a state in which internal pressure is replenished in a pressure cap for a cooling system of a vehicle in accordance with various exemplary embodiments of the present invention.

FIG. 4B shows a state in which pressure in the cooling system is lower than the predetermined range. When the pressure in the cooling system is lowered, the middle portion of the valve seal 16 is deformed downwardly and concavely. Since the valve seal 16 includes a flexible material and diameter of the lower body 12 supporting the pressure valve 15 is greater than that of the through hole formed in the pressure valve 15, the valve seal is concavely deformed toward the through hole formed in the lower body 12.

When the valve seal 16 is deformed downwardly and concavely, airtightness between the bottom surface of the pressure valve 15 and the lower body 12 is released. When the airtightness by the valve seal 16 is released, the external air is introduced from the communication port 11a through the lateral side of the lower body 12, the through hole of the pressure valve 15, the communication hole 16b of the valve seal 16 and the through hole of the lower body 12 and in turn pressure in the cooling system is raised to an appropriate range.

Figure 5:
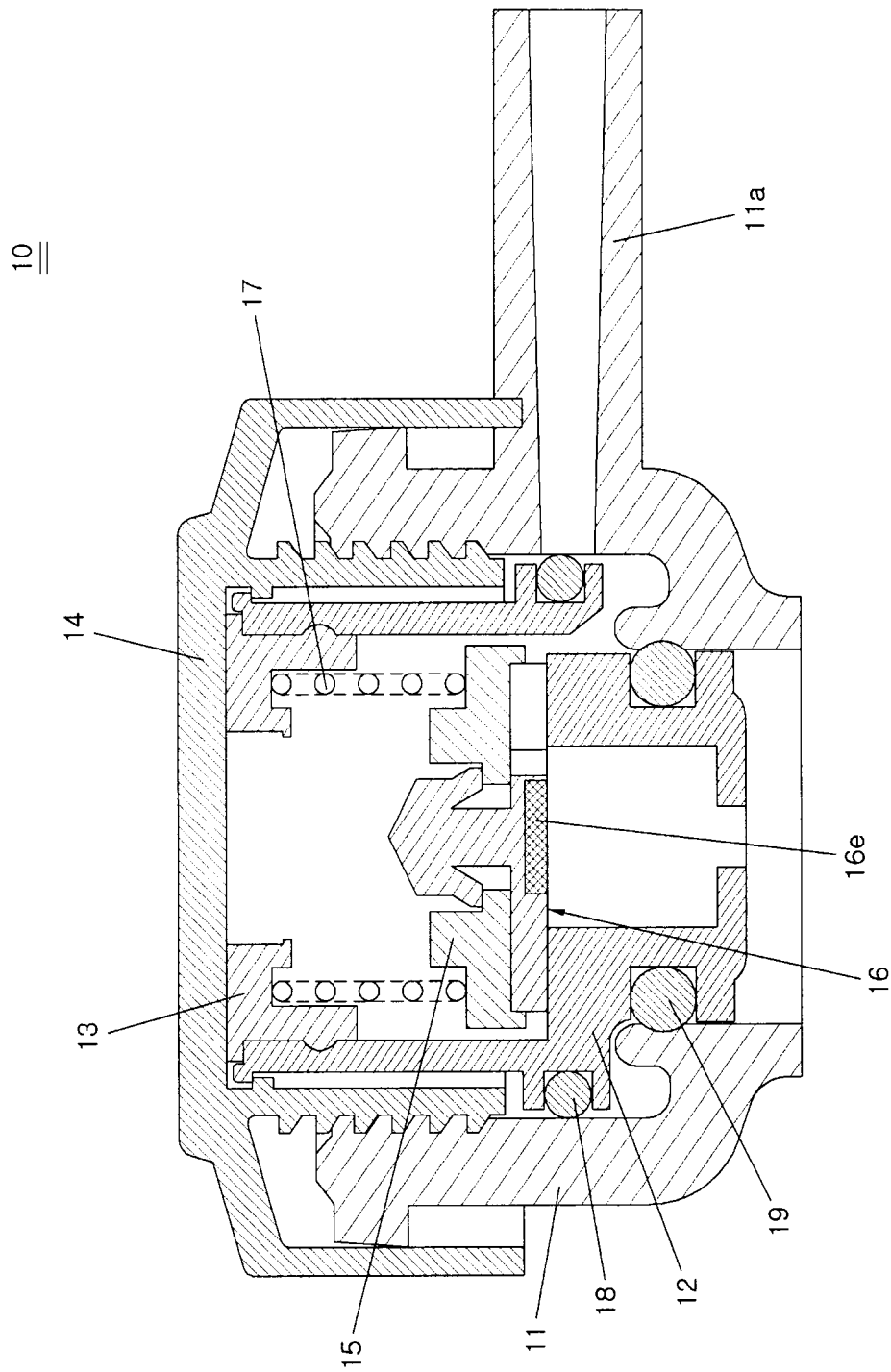
FIG. 5 is a cross-sectional view of a pressure cap for a cooling system of a vehicle in accordance with various exemplary embodiments of the present invention.

On the other hand, FIG. 5 illustrates a cross-sectional view of a pressure cap for a cooling system of a vehicle in accordance with various exemplary embodiments of the present invention.

In the exemplary embodiment of the present invention, a hard insert 16e is inserted into the valve seal 16 such that strength of the valve seal 16 is improved. The insert 16e includes synthetic resin or metal material and inserted into the middle portion of the valve seal body 16a of the valve seal 16, resulting in improvement of strength of the valve seal 16.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pressure cap apparatus for a cooling system of a vehicle, the apparatus comprising:
   a reservoir fill port which is mounted at an upper portion of a reservoir in which cooling water is stored or a radiator through which cooling water flows into a cooling system of the vehicle and is provided at a lateral side thereof with a communication port through which the cooling water or air flows;
   an external cap for closing an upper end portion of the reservoir fill port;
   a pressure valve disposed in the reservoir fill port to be configured for moving upwards and downwards and allow an inside and an outside of the reservoir fill port to fluidically-communicate with each other;
   a valve seal provided to contact with the pressure valve and allow the air to flow from the outside into the internal to the cooling system by being deformed when pressure in the internal to the cooling system is lower than a predetermined pressure; and
   a positive pressure spring elastically supporting the pressure valve such that the pressure valve closes the internal to the reservoir fill port,
   wherein the reservoir fill port further includes in the inside thereof a lower body supporting a bottom surface of the pressure valve and an upper body supporting an upper end portion of the positive pressure spring and wherein the valve seal includes a flexible material and is mounted between the pressure valve and the lower body,
   wherein the valve seal includes a valve seal body formed in a disk shape and disposed between the pressure valve and the lower body and wherein the valve seal body includes at least one communication hole for allowing upper and lower surfaces of the valve seal body to fluidically-communicate with each other, and
   wherein the communication hole is formed in plural numbers with a predetermined angular interval therebetween along a periphery of the valve seal.

2. The pressure cap apparatus according to claim 1, wherein the lower body is provided at its center with a through hole perforating the lower body in an axial direction thereof and wherein the through hole is formed to have a diameter larger than a through hole formed in the center of the pressure valve.

3. The pressure cap apparatus according to claim 1, wherein the valve seal body further includes a valve seal head formed to extend upwardly from the valve seal body such that the valve seal head penetrates the pressure valve and support protrusions extending downwardly from a periphery of the valve seal head and having a lower end portion supported at one side of the pressure valve, the support protrusions being distanced from each other with an interval therebetween.

4. The pressure cap apparatus according to claim 3, wherein the valve seal head is formed in a conical shape and formed to have an upper diameter greater than a diameter of the through hole formed at the center of the pressure valve.

5. The pressure cap apparatus according to claim 1, wherein the valve seal is configured to be raised together with the pressure valve and allows the reservoir fill port and the communication port to fluidically-communicate with each other when the pressure in the cooling system is higher than the predetermined pressure.

6. The pressure cap apparatus according to claim 1, wherein the valve seal is configured to be deformed such that the valve seal body is distanced from the bottom surface of the pressure valve and allow fluidical communication from the communication port to the internal to the reservoir fill port when the pressure in the cooling system is lower than the predetermined pressure.

7. The pressure cap apparatus according to claim 1, wherein the valve seal includes rubber or silicon material.

8. The pressure cap apparatus according to claim 1, wherein an insert for reinforcing strength of the valve seal body is inserted into the valve seal body of the valve seal.

9. The pressure cap apparatus according to claim 8, wherein the insert includes synthetic resin or metal material.

* * * * *